US012361465B2

(12) United States Patent
Kim

(10) Patent No.: US 12,361,465 B2
(45) Date of Patent: Jul. 15, 2025

(54) AUTOMATED RECOGNITION, REGISTRATION, AND TRACKING OF USER ITEMS AND INTELLIGENT MACHINE VALUATION OF USER ITEMS BASED ON PEER INTERESTS IN AN AUGMENTED-REALITY OR MIXED-REALITY ENVIRONMENT

(71) Applicant: DoubleMe, Inc., Seoul (KR)

(72) Inventor: Heekwan Kim, Seoul (KR)

(73) Assignee: DoubleMe, Inc., Seoul (KR)

( * ) Notice: Subject to any disclaimer, the term of this patent is extended or adjusted under 35 U.S.C. 154(b) by 0 days.

(21) Appl. No.: 18/536,725

(22) Filed: Dec. 12, 2023

(65) Prior Publication Data
US 2025/0191046 A1   Jun. 12, 2025

(51) Int. Cl.
*G06Q 30/0601* (2023.01)
*G06Q 30/0201* (2023.01)
*G06T 19/00* (2011.01)
*G06V 10/26* (2022.01)
(Continued)

(52) U.S. Cl.
CPC ..... *G06Q 30/0625* (2013.01); *G06Q 30/0206* (2013.01); *G06Q 30/0639* (2013.01); *G06T 19/006* (2013.01); *G06V 10/26* (2022.01); *G06V 10/764* (2022.01); *G06V 20/20* (2022.01)

(58) Field of Classification Search
None
See application file for complete search history.

(56) References Cited

U.S. PATENT DOCUMENTS

| | | | |
|---|---|---|---|
| 2019/0325498 A1* | 10/2019 | Clark | G06Q 30/0643 |
| 2020/0104893 A1* | 4/2020 | Schubert | G06Q 20/203 |
| 2021/0082037 A1* | 3/2021 | Oh | G06T 11/00 |

OTHER PUBLICATIONS

Pfeiffer, Jella, et al. "Eye-tracking-based classification of information search behavior using machine learning: evidence from experiments in physical shops and virtual reality shopping environments." Information systems research 31.3 (2020): 675-691. (Year: 2020)*

* cited by examiner

*Primary Examiner* — George Chen
(74) *Attorney, Agent, or Firm* — Invent Capture, LLC.; Samuel S. Cho

(57) ABSTRACT

A novel electronic system provides automated recognition, registration, and location tracking of physical, holographic, and/or virtual user items that can be visualized in a computer graphics-infused augmented-reality or mixed-reality environment with an electronic visualization device. The novel electronic system is also capable of executing intelligent machine valuation of user items and reflecting dynamic changes in valuation based on peer interests within the augmented-realty or mixed-reality environment. Each user item identified in the user's visual perspective through the electronic visualization device connected to the novel electronic system undergoes object extractions, class categorizations, and image segmentations by the novel electronic system to determine whether a particular item is substantive and worthy of location tracking, based on the item owner's preferences. The item is paired with related metadata and stored in a system database, and later retrieved by a search command in the augmented-reality or mixed-reality environment to display its known location.

6 Claims, 15 Drawing Sheets

1500

An Operation Flowchart for the User Item Price Recommendation Machine Intelligence Module in the Automated Item Recognition, Tracking, and Peer Interest-Based Item Valuation System

(51) Int. Cl.
*G06V 10/764* (2022.01)
*G06V 20/20* (2022.01)

100

A Perspective View of Unorganized Items on a Floorspace

200

A User Wearing a Head-Mounted Display (HMD) Device to Visualize Unorganized Items in a Mixed-Reality (MR) Environment Generated by the Novel System

300

A User Viewing a Display Screen of a Smart Phone to Visualize Unorganized Items in an Augmented-Reality (AR) Environment Generated by the Novel System

400

An Example of Automated Item Recognition, Classification, and Tracking in Augmented or Mixed-Reality Environment Generated by the Novel System

500

Intelligently Filtering Out Extraneous Objects & Registering Important Objects in the User's Field of Vision in AR / MR Environment

600

Instruction from AR/MR Environment to the User's Field of Vision

700

User Invoking Registered Item Location Search from the Novel System in the AR/MR Environment

800

The Novel System Enabling Visualization of the Real-Time Location of the Registered & Searched Item in the AR/MR Environment

900

User Approaching the Physical Location Containing the Searched Item in the AR/MR Environment

1000

User Grabbing the Searched Item (i.e. light stick) Physically in the AR/MR Environment

1100

User Following the Earlier Instruction from an AR/MR Content to Utilize the Searched & Recovered Physical Item in the AR/MR Environment An Operation Flowchart for the Item Registration & Recognition Module in the Automated Item Recognition, Tracking, and Peer Interest-Based Item Valuation System An Operation Flowchart for the User Item Price Recommendation Machine Intelligence Module in the Automated Item Recognition, Tracking, and Peer Interest-Based Item Valuation System

AUTOMATED RECOGNITION, REGISTRATION, AND TRACKING OF USER ITEMS AND INTELLIGENT MACHINE VALUATION OF USER ITEMS BASED ON PEER INTERESTS IN AN AUGMENTED-REALITY OR MIXED-REALITY ENVIRONMENT

BACKGROUND OF THE INVENTION

The present invention generally relates to automation of user item organizations and monetization opportunity creations through machine intelligence and computer graphics-aided visualizations to various users immersed in an augmented reality (AR) or mixed-reality (MR) environment. In particular, the present invention relates to automated and computerized recognition, registration, and tracking of user items and computer graphics-aided AR or MR visualization of registered and tracked user items with a three-dimensional (3D) visualization headset, a smart phone, or another mobile device. Furthermore, the present invention also relates to intelligent machine valuation of registered and tracked user items based on peer user interests in the AR or MR environment.

In recent years, virtual reality (VR) and augmented reality (AR) applications are increasingly gaining popularity and relevance in electronic user applications. For example, VR headsets for computers and portable devices are able to provide interactive and stereoscopic gaming experiences, training simulations, and educational environments for users wearing the VR headsets. In another example, augmented reality (AR) mobile applications are designed to add texts, descriptions, or added (i.e. "augmented") digitized materials to physical objects if a user wears AR goggles or utilizes AR-compatible mobile applications executed in portable devices. For one of ordinary skill in the art, virtual reality (VR) refers to a completely computer-generated synthetic environment with no direct correlations to a real physical space or a real physical object, while augmented reality (AR) refers to descriptive digital materials that are displayed next to a machine-recognized real physical object to add or "augment" more information to the physical reality.

Furthermore, a recent evolution of conventional VR and AR applications has resulted in an innovative intermixture of computer-generated lifelike holographic objects and real objects that are synchronized and correlated to a particular physical space (i.e. as a "mixed-reality" (MR) environment) for immersive user interactions during the user's visit to the particular physical space. Although mixed-reality (MR) and augmented-reality (AR) applications have been created and deployed in limited and experimental capacity as computer graphics-aided visualization tools for consumers, existing MR and AR applications available in the market today are not yet fundamentally integrated in users' everyday lives to make their routine activities more efficient and satisfying.

Consumers often have difficulty remembering where they placed various things and items in their households and offices. Some people end up wasting hours or even days of precious time in search of items they have misplaced or forgotten in their busy lives. Therefore, it may be advantageous to devise a novel electronic system and a related method of operation that provide automated item recognition and location tracking with computer graphics-aided visualization to users immersed in an augmented-reality (AR) or mixed-reality (MR) environment.

Furthermore, it may also be advantageous to devise a novel electronic system and a related method of operation that provide peer user interest-based item valuation for registered items that are owned by a particular user immersed in the AR or MR environment. In addition, it may also be advantageous to devise a novel electronic system and a related method of operation that enable autonomous intelligent machine valuation of user items that are registered and visualized in the AR or MR environment based on real-time changes in peer user interests and comparable pricing metrics from online stores or auction sites.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

An automated item recognition, tracking, and peer interest-based item valuation system is disclosed. In a preferred embodiment of the invention, this system comprises: (1) a computer graphics-generated and physical object visualization device configured to enable a user to visualize an intermixture of physical objects and computer graphics-generated holograms, images, icons, or texts within the user's field of view of the physical objects in a mixed-reality (MR) or augmented-reality (AR) environment; (2) an item recognition and registration module operatively connected to the computer graphics-generated and physical object visualization device, wherein the item recognition and registration module receives a captured image of the user's field of view from a camera integrated in the computer graphics-generated and physical object visualization device, and subsequently executes a real-time object detection model to perform item classification involving object extractions and class categorizations from the captured image, and then performs image segmentation to separate background scenes from foreground item images contained in the captured image, with an output of the item recognition and registration module being a user item image separated from extraneous information in the captured image after executing the real-time object detection model and the image segmentation, and wherein the user item image is subsequently registered and stored in a system database; (3) an item search accommodation module operatively connected to the item recognition and registration module and the computer graphics-generated and physical object visualization device, wherein the item search accommodation module provides a registered item search interface to the user immersed in the MR or AR environment, accesses the system database and retrieves a search result containing a list of relevant items, and displays a particular item and related metadata selected by the user among the list of relevant items, and wherein the item search accommodation module indicates graphically within the user's field of view a current known location of the particular item searched by the user and also inquires the user whether the user likes or intends to purchase the particular item, if the particular item is owned by another system user in the MR or AR environment; (4) a user item price recommendation machine intelligence module operatively connected to the item search accommodation module and the computer graphics-generated and physical object visualization device, wherein the user item price recommendation machine intelligence module accumulates changes in peer user interests in the particular item over a defined period of time in the MR or AR environment, autonomously seeks, updates, and stores current price trends and order trends of the particular item in online storefronts and auction sites, and creates and updates a machine-recommended selling price for the particular item based on changes in the peer user interests, the current price trends, and the order trends of the particular item over the defined period of time; and (5) a computer graphics synthesis module executed in a graphics processing unit (GPU) and a memory unit of a computer server, wherein the computer graphics synthesis module is operatively connected to all other modules in this system and creates graphical and textual information regarding the current known location of the particular item searched by the user and the machine-recommended selling price for the particular item for visualization by the user and peer users in the MR or AR environment.

DETAILED DESCRIPTION

Figure 1:
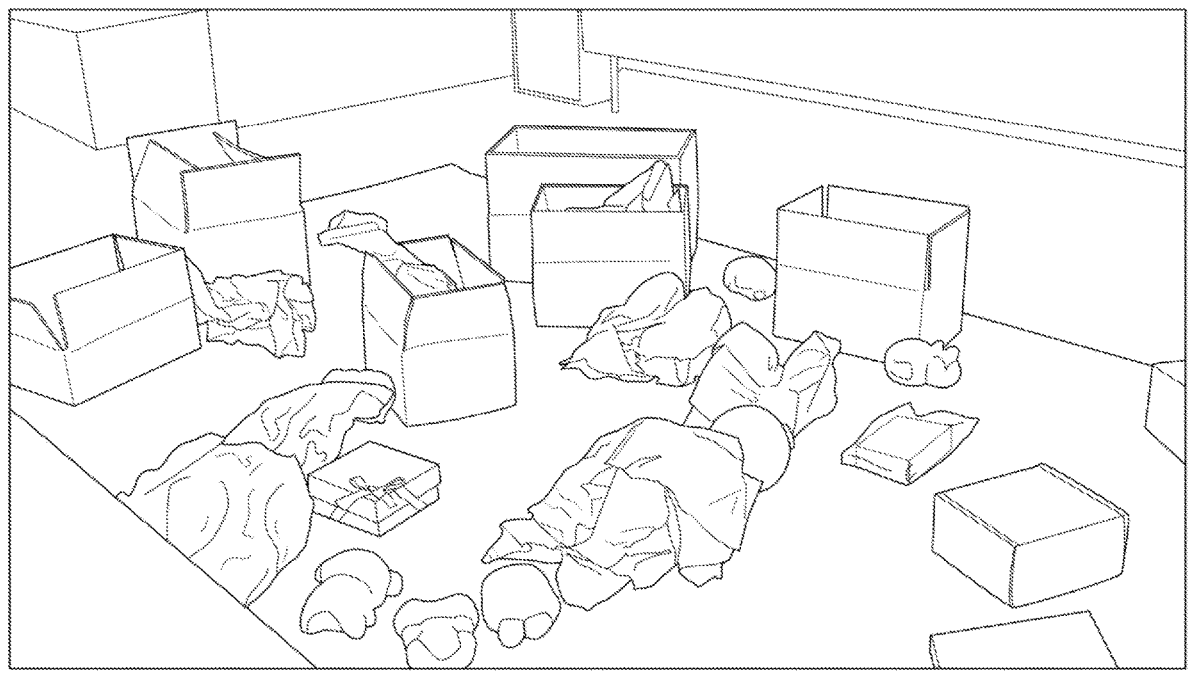
FIG. 1 shows a perspective view of unorganized items on a floorspace.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and methods for automated item recognition, tracking, and peer interest-based item valuation based on intelligent and autonomous machine intelligence. These process descriptions and representations are the means used by those experienced or skilled in the art to convey the substance of their work most effectively to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel electronic system and a related method of operation that enable automated item recognition and location tracking with computer graphics-aided visualization to users immersed in an augmented-reality (AR) or mixed-reality (MR) environment.

Furthermore, another objective of an embodiment of the invention is to provide a novel electronic system and a related method of operation that enable peer user interest-based item valuation for registered items that are owned by a particular user immersed in the AR or MR environment.

Another objective of an embodiment of the present invention is to provide a novel electronic system and a related method of operation that enable autonomous intelligent machine valuation of user items that are registered and visualized in the AR or MR environment based on real-time changes in peer user interests and comparable pricing metrics from online stores or auction sites.

Another objective of an embodiment of the present invention is to provide a novel electronic system and a related method of operation that enable item purchases, exchanges, and/or transactions between a current item owner and an interested peer user immersed in the computer graphics-aided visualizations in the AR or MR environment.

For the purpose of describing the invention, a term referred to as "mixed reality," or "MR," as an acronym, is defined as an intermixture of computer-generated lifelike holographic objects and real physical objects that are synchronized and correlated to a particular physical space (e.g. a user's room or office) for immersive user interactions during the user's visualization of a computer graphics-aided environment through a head-mounted display (HMD) or another electronic visualization device.

Typically, the computer-generated lifelike holographic objects are ultra high-resolution (e.g. 4K/UHD) or high-resolution (e.g. HD quality or above) three-dimensional synthetic objects that are intermixed and/or juxtaposed to real physical objects, wherein a user immersed in the mixed-reality environment is often unable to distinguish the synthetic nature of the computer-generated lifelike holographic objects and the real physical objects provided by the mixed-reality environment. The user immersed in the mixed-reality environment may be locally present at the particular physical space (e.g. the user's room or office), which is correlated and synchronized with the computer-generated lifelike holographic objects and the real physical objects in one or more mixed-reality artificial layers superimposed on the particular physical space.

Moreover, for the purpose of describing the invention, a term referred to as "item" is defined as a physical or holographic object that can be owned by a user and registered to a database connected to or incorporated by the automated item recognition, tracking, and peer interest-based item valuation system. Some examples of "items" in an embodiment of the present invention include, but are not limited to, a physical perfume bottle, a colorful holographic doll, a physical handbag, a holographic dress, and a physical pair of shoes. In a preferred embodiment of the invention, a registered item in the database may be visualized and sold or auctioned with other peer users, if the owner of the registered item has permitted the system to share the computer graphics-aided MR or AR visualization of the registered item and its associated metadata with other peer users of the system.

Furthermore, for the purpose of describing the invention, a term referred to as a "mixed-reality artificial layer" is defined as a computer-generated graphics layer in which mixed-reality objects (MROs) and mixed-reality holographic humans (e.g. users with registered items in the system, or other users who are interested in visualizing the registered items as potential buyers) are created and positioned by the automated item recognition, tracking, and peer interest-based item valuation system onto virtual coordinates, which correlate to a particular physical space of a viewer's interest, such as a physical room or a physical office space of the user with registered items.

Moreover, for the purpose of describing the invention, a term referred to as "hologram" is defined as a three-dimensional holographic object configured to be displayed from a head-mounted display (HMD) device, a mobile device executing a mixed-reality visual mobile application, or another electronic device with a visual display unit. Typically, a hologram is capable of being animated as a three-dimensional element over a defined period of time. Examples of holograms utilized in mixed-reality environments generated by the automated item recognition, tracking, and peer interest-based item valuation system include, but are not limited to, a holographic item owned and registered by a user, a first humanized holographic figure representing the user who owns the holographic item or a physical item, a second humanized holographic figure representing a peer user who is interested in purchasing the holographic item or the physical item, a holographic space representing the user's room or office, a holographic furniture where the holographic item is placed, or another holographic object which can be intermixed with or juxtaposed to physical objects for seamlessly-vivid visualizations of both artificial holograms and physical objects.

In addition, for the purpose of describing the invention, a term referred to as "three-dimensional model," or "3D model," is defined as one or more computer-generated three-dimensional images, videos, or holograms. In a preferred embodiment of the invention, a computerized 3D model is created as a hologram after multi-angle video data are extracted, transformed, and reconstructed by three-dimensional graphics processing algorithms executed in a computer system or in a cloud computing resource comprising a plurality of networked and parallel-processing computer systems. The computer-generated 3D model can then be utilized as a mixed-reality object (MRO) or a humanized mixed-reality hologram (MRH) in a mixed-reality artificial layer superimposed on a particular physical space correlated by virtual coordinates from an automated item recognition, tracking, and peer interest-based item valuation system.

Moreover, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each perform computerized tasks related to automated item image or object recognitions, item registrations in a database, item location tracking, and intelligent machine-determined peer interest-based item valuations. In some embodiments of the invention, the cloud computing resource may also be configured to extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers can enable a real-time or near real-time transformation and reconstruction of 3D models after video recording devices transmit multi-angle video data to the cloud computing resource.

FIG. 1 shows a perspective view (100) of unorganized items on a floorspace. In this example, a plurality of boxes, gift products, newspapers, dolls, and other items are spread across the floor, which are not yet registered and processed by the automated item recognition, tracking, and peer interest-based item valuation system. For most users, it would be time consuming to separate important items from waste materials manually in such instances, and would also be difficult to remember the location of each important item once it is placed at a particular place at home or office.

Figure 2:
FIG. 2 shows a user wearing a head-mounted display (HMD) device to visualize unorganized items in a mixed-reality (MR) environment generated by an automated item recognition, tracking, and peer interest-based item valuation system, in accordance with an embodiment of the invention.

FIG. 2 shows an example (200) of a user wearing a head-mounted display (HMD) device to visualize unorganized items in a mixed-reality (MR) environment generated by an automated item recognition, tracking, and peer interest-based item valuation system, in accordance with an embodiment of the invention. The user wearing the HMD device to immerse in a three-dimensional (3D) computer graphics-aided mixed-reality (MR) visualization environment is a preferred embodiment of the invention, in which various items within the visual view of the HMD device can be readily scanned, recognized, registered, and stored in a database connected to the system. The registered items can then be dynamically linked to system-generated metadata, such as names, ownerships, and real-time changes in machine-determined valuations of the registered items, and retrieved by a system user for 3D visualization in the HMD when a particular registered item is within the field of view by the HMD device worn by the system user.

Figure 3:
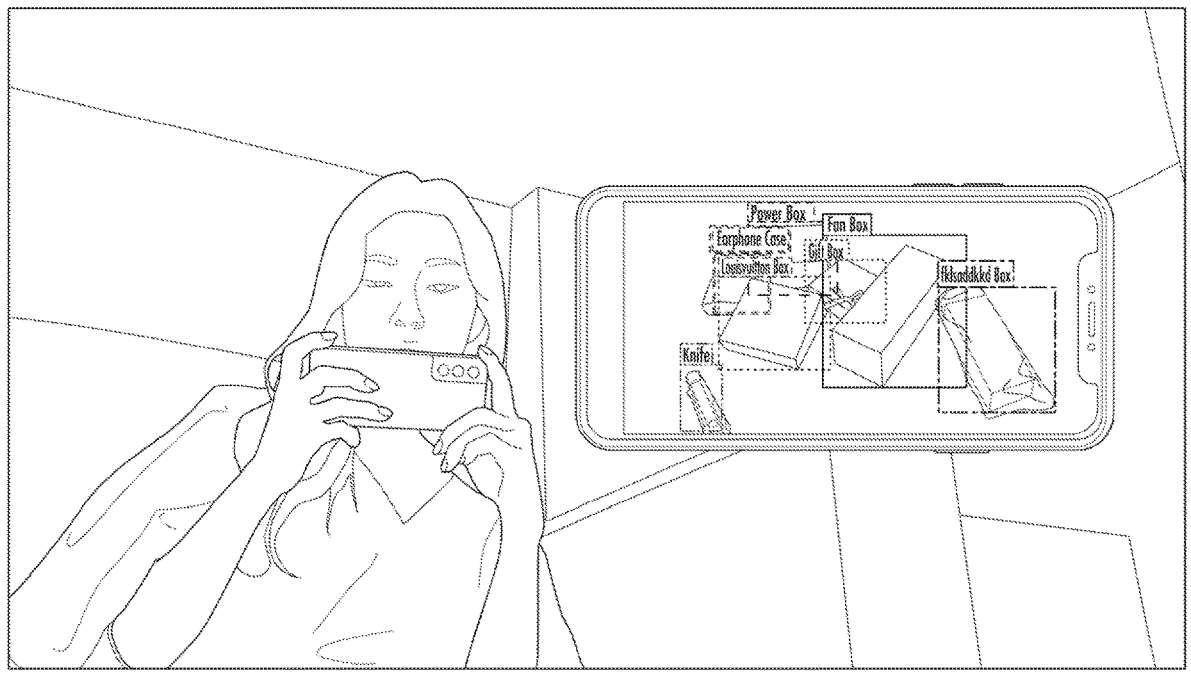
FIG. 3 shows a user viewing a display screen of a smart phone to visualize unorganized items in an augmented-reality (AR) environment generated by the automated item recognition, tracking, and peer interest-based item valuation system, in accordance with an embodiment of the invention.

FIG. 3 shows an example (300) of a user viewing a display screen of a smart phone to visualize unorganized items in an augmented-reality (AR) environment generated by the automated item recognition, tracking, and peer interest-based item valuation system, in accordance with an embodiment of the invention. The illustration as depicted in this example (300) in FIG. 3 is an alternate embodiment to the preferred embodiment of the invention previously shown and described in FIG. 2. In this example (300), the user utilizes the display screen and an integrated camera of the smart phone to visualize unorganized items in the augmented-reality (AR) environment generated by the novel system. As shown in FIG. 3, the automated item recognition, tracking, and peer interest-based item valuation system is able to scan, identify, and categorize various items (e.g. earphone case, knife, various boxes with branding, etc.) autonomously without human intervention, and subsequently overlays machine-generated item categorizations to the user in the AR environment of the smart phone display screen.

Figure 4:
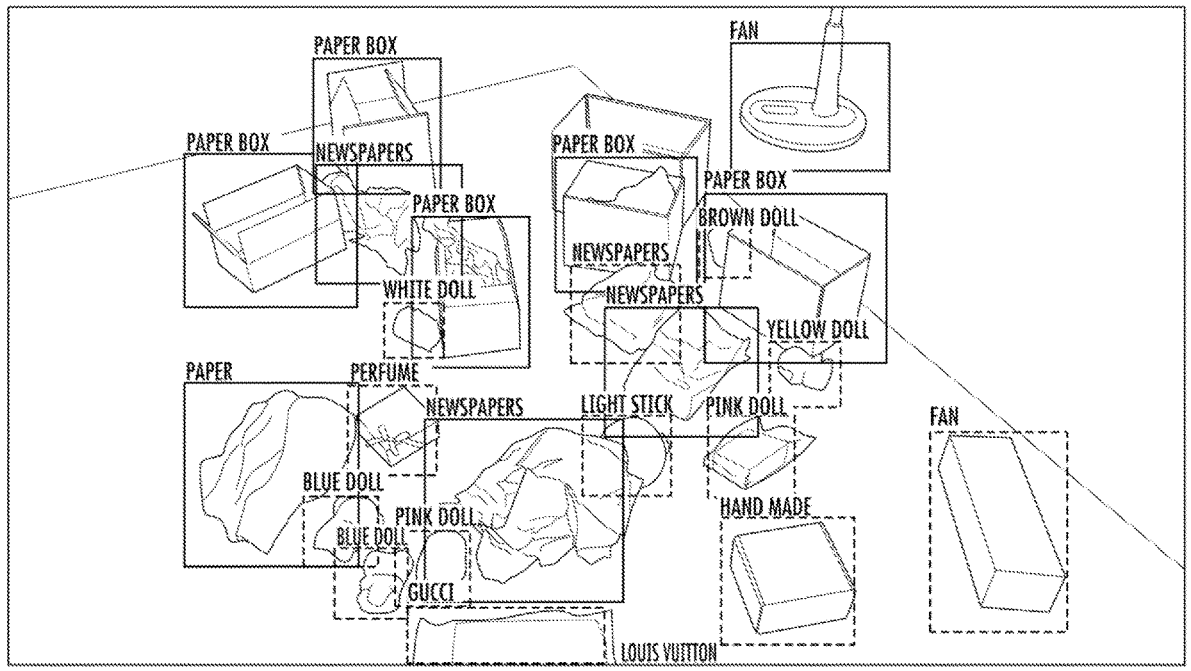
FIG. 4 shows an example of automated item recognition, classification, and tracking in augmented or mixed-reality environment generated by the automated item recognition, tracking, and peer interest-based item valuation system, in accordance with an embodiment of the invention.

FIG. 4 shows an example (400) of automated item recognition, classification, and tracking in augmented or mixed-reality environment generated by the automated item recognition, tracking, and peer interest-based item valuation system, in accordance with an embodiment of the invention. At this stage of the automated item recognition by the novel system as shown in the example (400), the novel system is capable of autonomously (i.e. without human intervention) classifying and differentiating between substantive items (e.g. a light stick, a perfume box, a designer gift box, a fan, dolls, etc.) and non-substantive items (e.g. newspaper wraps, gift wraps, generic paper boxes, etc.). In the example (400) illustrated in FIG. 4, the substantive items are identified and classified with perforated rectangles, while non-substantive items are identified and classified with solid rectangles.

The autonomous machine differentiation of substantive and non-substantive items by the automated item recognition, tracking, and peer interest-based item valuation system can be visually indicated and displayed (i.e. as perforated rectangles vs. solid rectangles) through a user's HMD device in case of a mixed-reality (MR) environment implementation of the novel system in one instance, or through the user's smart phone display screen in case of an augmented reality (AR) environment implementation of the novel system in another instance. In a preferred embodiment of the invention, the automated item recognition, tracking, and peer interest-based item valuation system may also incorporate an adaptive logic that receives subsequent feedbacks from item owners and system users to enhance the accuracy of autonomous machine differentiation rates between substantive and non-substantive items.

Figure 5:
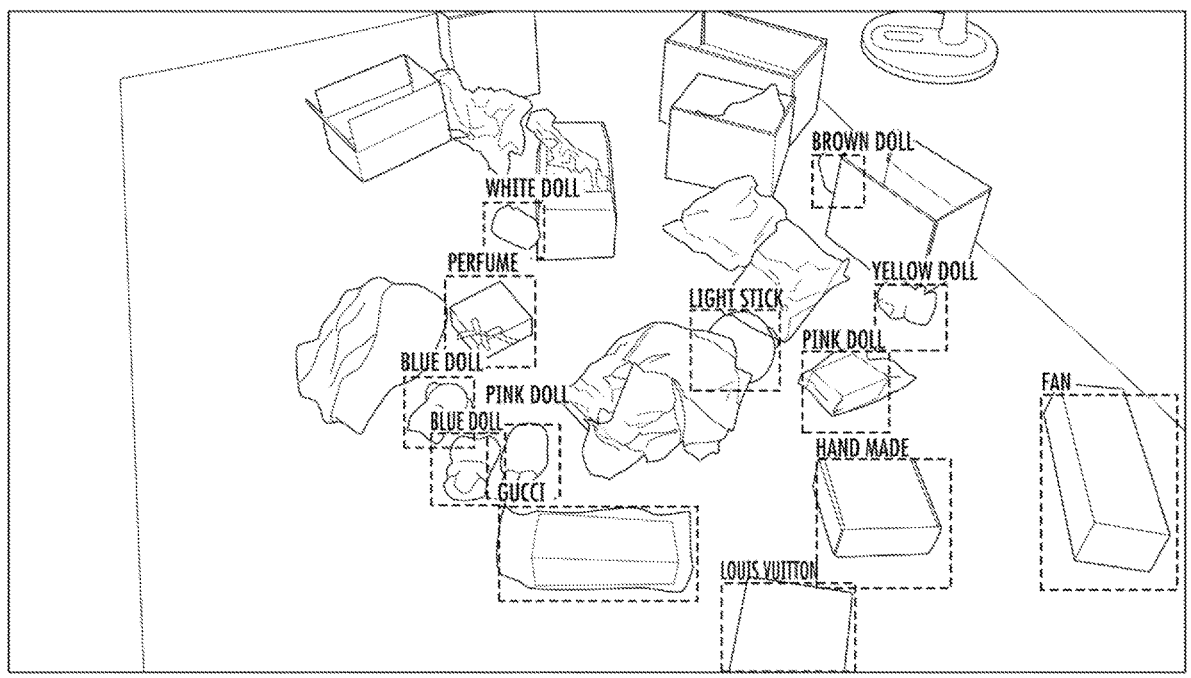
FIG. 5 shows the automated item recognition, tracking, and peer interest-based item valuation system intelligently filtering out extraneous objects and registering important objects in the user's field of vision in an AR or MR environment, in accordance with an embodiment of the invention.

FIG. 5 shows an example (500) of the automated item recognition, tracking, and peer interest-based item valuation system intelligently filtering out extraneous objects and registering important objects in the user's field of vision in an AR or MR environment, in accordance with an embodiment of the invention. As depicted in this example (500), extraneous objects, such as newspaper wraps, gift wraps, and generic paper boxes that were previously identified and classified in solid rectangles as potentially "non-substantive" by the novel system in FIG. 4, are automatically filtered out and removed from the user's field of vision in the AR or MR environment.

In the preferred embodiment of the invention, the novel system may also provide a user interface to further refine and modify the machine-determined preliminary differentiations between "substantive" and "non-substantive" items. In the example (500) as illustrated in FIG. 5, "substantive" items (e.g. a light stick, a fan, a perfume box, a designer gift box, dolls, etc.) are defined as objects that will be kept and stored by the user for future retrieval. In contrast, "non-substantive" items (e.g. newspaper wraps, gift wraps, generic paper boxes, etc.) may be objects that the user is likely to dispose permanently, with no intention of future retrieval. Typically, "substantive" items are deemed worthy of assigning material valuations in monetary terms, in contrast to "non-substantive" items which are not deemed worthy of assigning material valuations in monetary terms, at least from the perspective of the item owner.

Figure 6:
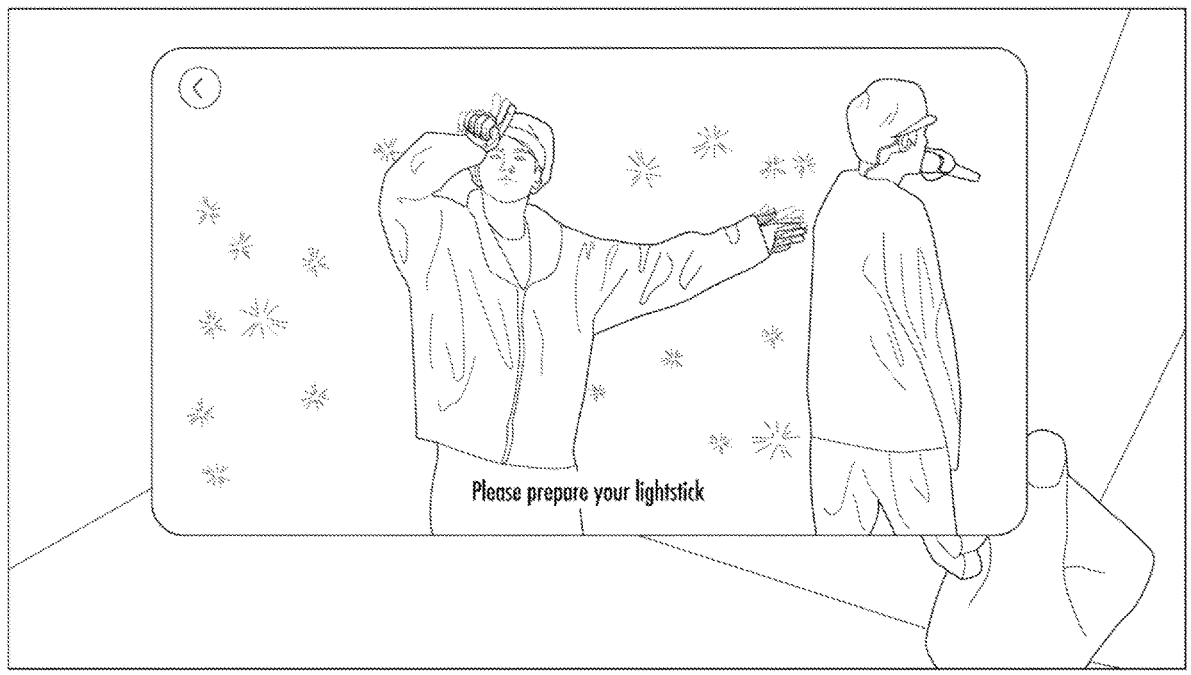
FIG. 6 shows an example of an instruction from the AR/MR environment to the user's field of vision, in accordance with an embodiment of the invention.

FIG. 6 shows an example (600) of an instruction (i.e. "please prepare your light stick") from the augmented-reality (AR) or mixed-reality (MR) environment to the user's field of vision, in accordance with an embodiment of the invention. In this example (600), the user is immersed in a pop music content visualized in a three-dimensional (3D) holographic mixed-reality environment with a head-mounted display (HMD) device, and receives an instruction from the pop music content to prepare a light stick to wave and sing along with the popstars featured in the MR environment. In another embodiment of the invention, the user may utilize a smart phone's display screen to view the augmented-reality (AR) environment that incorporates and displays the pop music content and the instruction.

Figure 7:
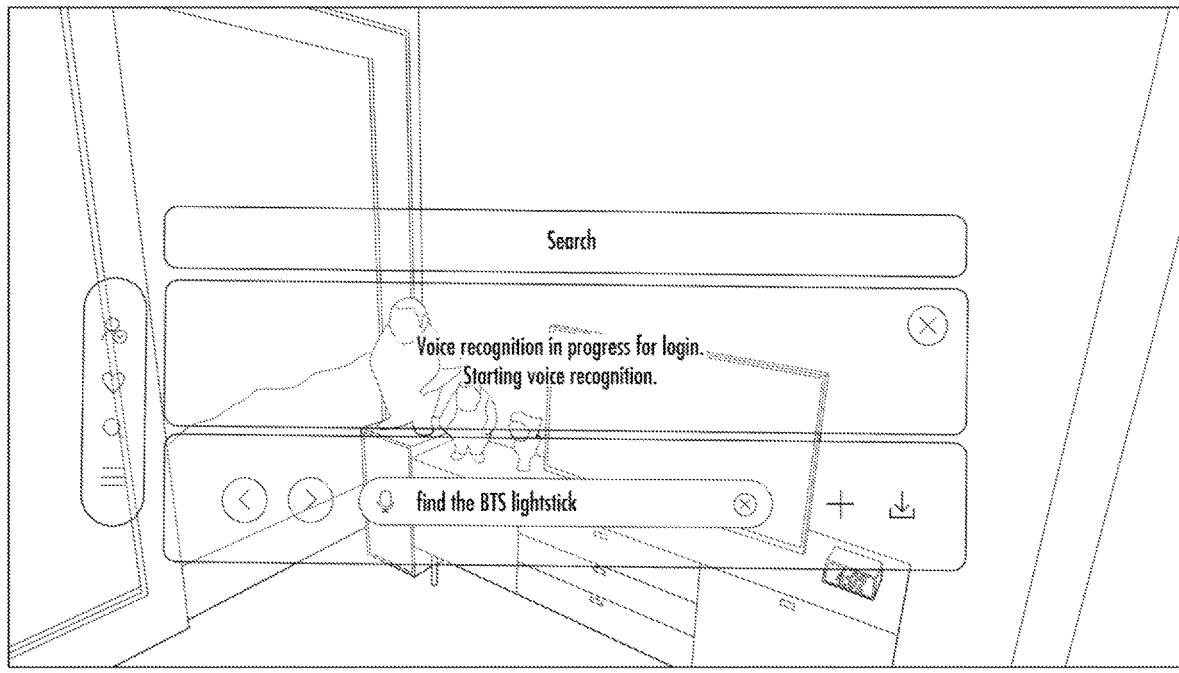
FIG. 7 shows an example of the user invoking registered item location search from the automated item recognition, tracking, and peer interest-based item valuation system in the AR/MR environment, in accordance with an embodiment of the invention.

FIG. 7 shows an example (700) of the user invoking registered item location search from the automated item recognition, tracking, and peer interest-based item valuation system in the AR/MR environment, in accordance with an embodiment of the invention. In this example (700), the user invokes the registered item location search using voice command while being immersed in the 3D holographic mixed-reality environment, resulting in a holographic and translucent search menu displayed in the user's head-mounted display (HMD) device. As illustrated in FIG. 7, the user is also able to perceive physical objects, such as room walls, a television stand with drawers, and a television located on top of the television stand through the translucent search menu visualized in the holographic mixed-reality environment provided by the automated item recognition, tracking, and peer interest-based item valuation system.

In the example (700) as shown in FIG. 7, the user is searching for the current location of the light stick, following the instruction in the pop music content as previously illustrated in FIG. 6. In the preferred embodiment of the invention, the automated item recognition, tracking, and peer interest-based item valuation system is configured to store and update the current location of each item (e.g. the light stick) registered in the system autonomously by executing object recognition commands continuously in the background to identify any registered items within the user's field of vision via an HMD device or a smart phone camera. If any of the registered items are recognized within the user's field of vision via the HMD device or the smart phone camera, then the automated item recognition, tracking, and peer interest-based item valuation system may update location metadata associated with the registered items. Over time, the location information for most, if not all, of the registered items get updated and remain current and accurate, as long as the user routinely or frequently utilizes the HMD device or the smart phone camera to invoke the mixed-reality or augmented-reality environment.

Figure 8:
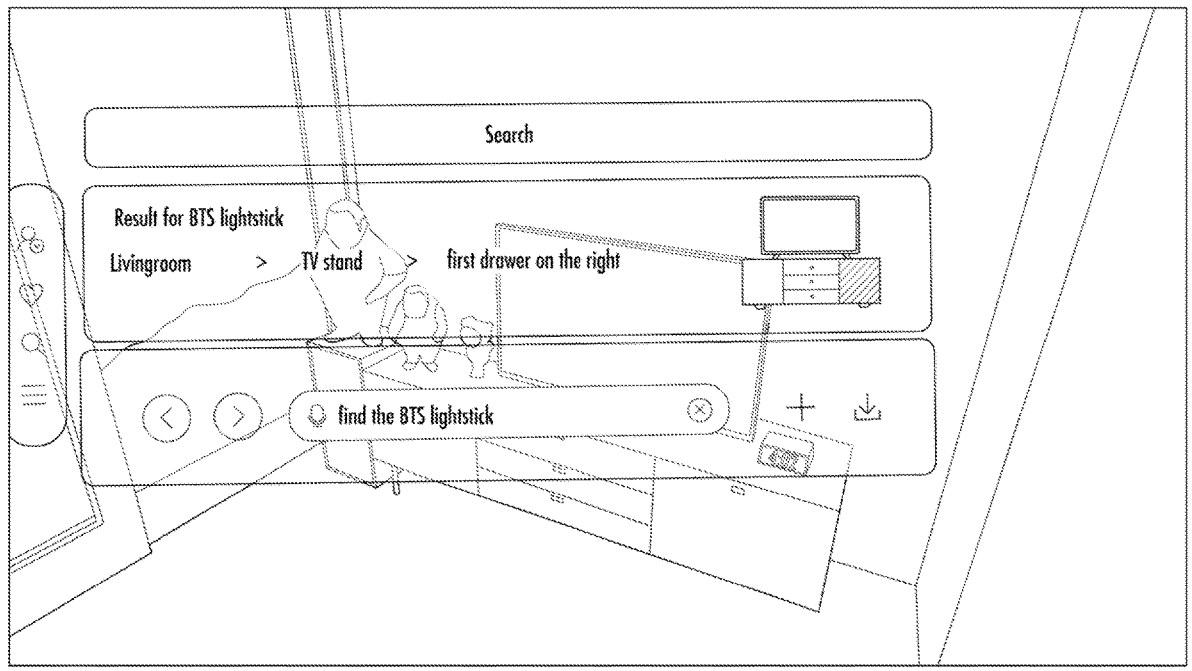
FIG. 8 shows an example of the automated item recognition, tracking, and peer interest-based item valuation system enabling visualization of the real-time location of the registered and searched item in the AR/MR environment, in accordance with an embodiment of the invention.

FIG. 8 shows an example (800) of the automated item recognition, tracking, and peer interest-based item valuation system enabling visualization of the real-time location of the registered and searched item in the AR/MR environment, in accordance with an embodiment of the invention. In this example (800), the holographic and translucent search menu displayed in the user's head-mounted display (HMD) device graphically and textually indicates a specific location (i.e. a right-side drawer in the television stand) that currently contains the registered and searched item (i.e. the light stick).

As illustrated in FIG. 8, in this example (800), a computer graphics-generated icon in the shape of the television stand in the holographic and translucent search menu is provided by the automated item recognition, tracking, and peer interest-based item valuation system. This icon is then visualized by the user using the HMD device or a smart phone display screen. The icon has the right-side drawer highlighted in the menu, as the corresponding physical right-side drawer is also within the user's field of vision in the MR or AR environment. Furthermore, in this example (800), textual information in the holographic and translucent search menu also describes where the light stick is located (i.e. "Results for BTS light stick: Livingroom>TV stand>first drawer on the right").

In another embodiment of the invention, the search menu generated by the automated item recognition, tracking, and peer interest-based item valuation system may be a two-dimensional menu, instead being a 3D hologram.

Furthermore, in another embodiment of the invention, the search menu may be opaque instead of being translucent, thus not allowing any visibility of the objects (e.g. walls, TV stand, drawers, etc.) behind the menu displayed in the user's visual perspective in the AR or MR environment. Yet in another embodiment of the invention, the search menu may be transparent instead of being translucent, thus allowing a transparent glasslike (i.e. totally-clear) visibility of the objects behind the menu displayed in the user's visual perspective in the MR or AR environment.

Figure 9:
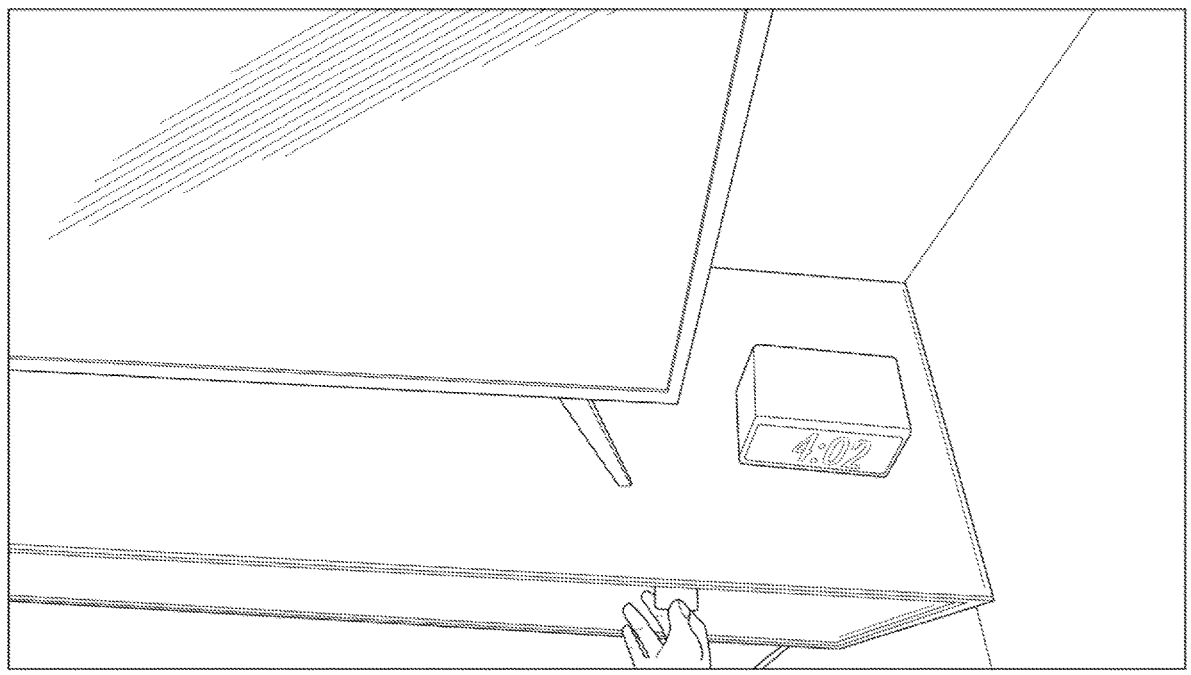
FIG. 9 shows the user approaching the physical location containing the searched item (i.e. the light stick) in the AR/MR environment, in accordance with an embodiment of the invention.

FIG. 9 shows a screenshot (900) in which the user approaches the physical location (i.e. the right-side drawer) containing the searched item (i.e. the light stick) in the AR/MR environment, in accordance with an embodiment of the invention. Typically, the automated item recognition, tracking, and peer interest-based item valuation system enables an immersive mixed-reality (MR) environment where the user continues to wear the HMD device or utilizes the smart phone display screen to visualize real physical objects as well as computer graphics-generated menus, icons, holographic objects, and/or textual information while walking around a physical space to find the searched item.

Figure 10:
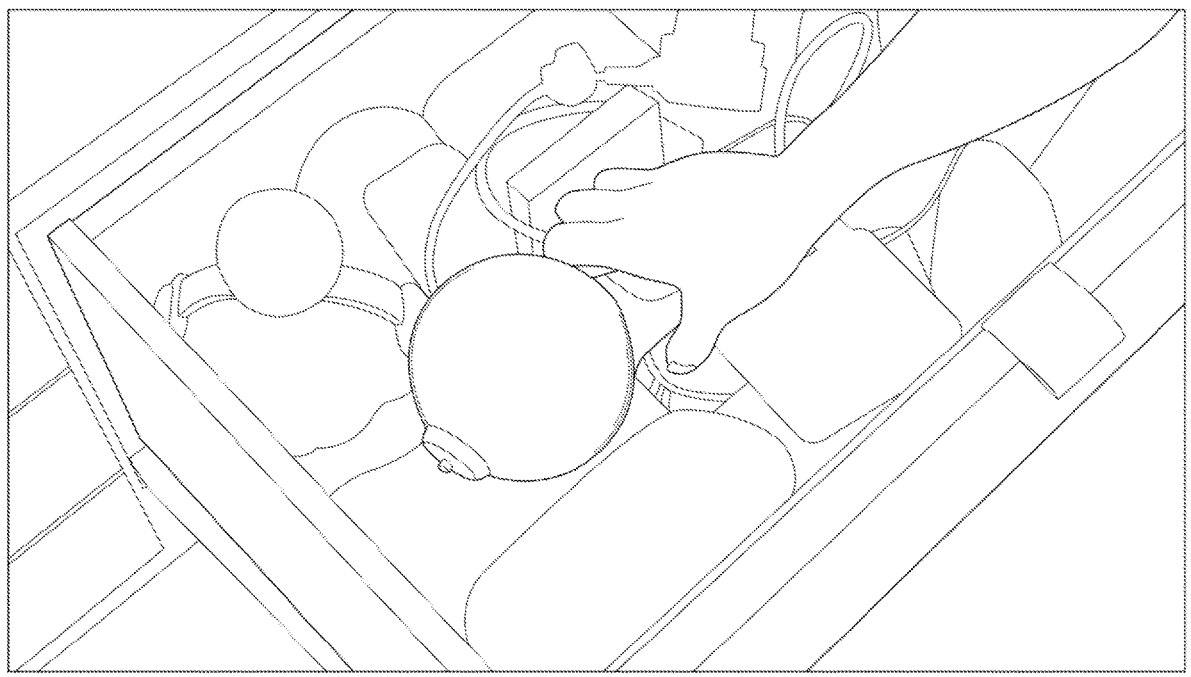
FIG. 10 shows the user grabbing the searched item (i.e. the light stick) physically in the AR/MR environment, in accordance with an embodiment of the invention.

FIG. 10 shows a screenshot (1000) of the user grabbing the searched item (i.e. the light stick) physically in the AR/MR environment, in accordance with an embodiment of the invention. In the preferred embodiment of the invention, the user is still visually immersed in the AR/MR environment by retaining his or her field of vision through a head-mounted display (HMD) device in case of the mixed-reality (MR) environment, or through a smart phone display screen in case of the augmented-reality (AR) environment.

Figure 11:
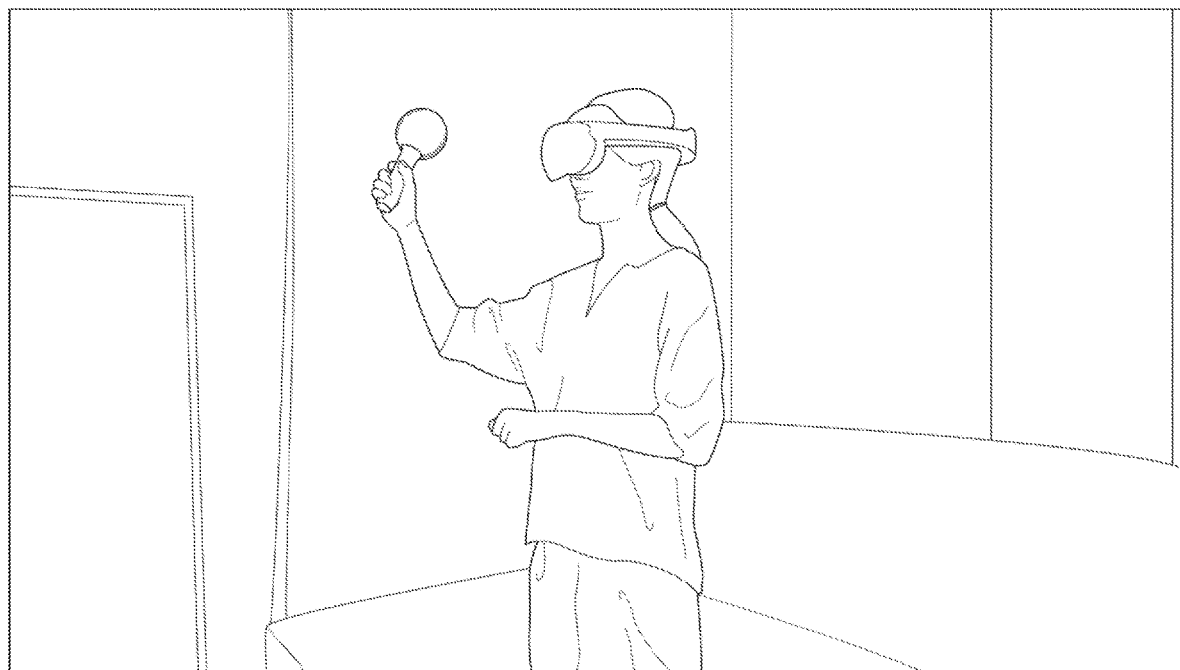
FIG. 11 shows the user following the earlier instruction from an AR/MR content to utilize the searched and recovered physical item in the AR/MR environment, in accordance with an embodiment of the invention.

FIG. 11 shows a screenshot (1100) of the user following the earlier instruction (i.e. "please prepare your light stick") from an AR/MR content to utilize the searched and recovered physical item (i.e. light stick) in the AR/MR environment, in accordance with an embodiment of the invention. As illustrated in the screenshot (1100) in FIG. 11, the user is able to wave the light stick and sing and/or dance along with the popstars visualized in the mixed-reality (MR) environment via the head-mounted display (HMD) device. FIGS. 1~11 and related descriptions herein have demonstrated a realistic usage and/or system application example for the automated item recognition, tracking, and peer interest-based item valuation system.

Figure 12:
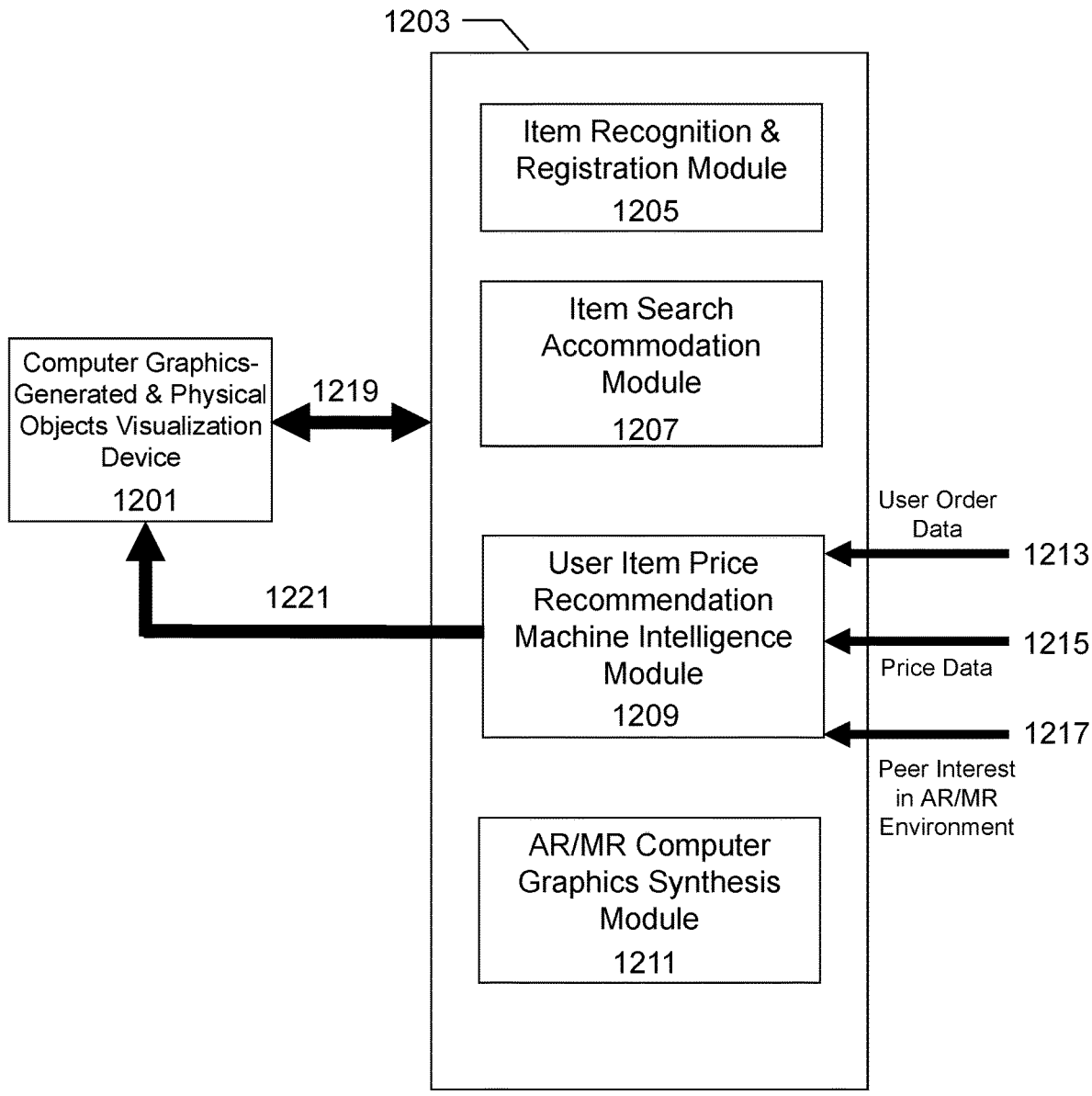
FIG. 12 shows an automated item recognition, tracking, and peer interest-based item valuation system diagram in augmented or mixed-reality environment, in accordance with an embodiment of the invention.

FIG. 12 shows an automated item recognition, tracking, and peer interest-based item valuation system diagram (1200) in augmented or mixed-reality environment, in accordance with an embodiment of the invention. In the preferred embodiment of the invention, the automated item recognition, tracking, and peer interest-based item valuation system comprises a core system logic block (1203) comprising an item recognition and registration module (1205), an item search accommodation module (1207), a user item price recommendation machine intelligence module (1209), and an augmented reality (AR)/mixed-reality (MR) computer graphics synthesis module (1211), as shown in the exemplary system diagram (1200). Typically, the core system logic block (1203) is executed in a central processing unit (CPU), a graphical processing unit (GPU), and/or a memory unit of one or more computer servers, which are part of a scalable cloud computing resource, and is operatively connected to external data networks, devices, and servers. In the preferred embodiment of the invention, each module (i.e. 1205, 1207, 1209, 1211) may be implemented as programmable software modules that are stored in a non-volatile data storage unit and dynamically uploaded and executed by the CPU, the GPU, and/or the memory unit of one or more computer servers. In an alternate embodiment of the invention, one or more modules (i.e. 1205, 1207, 1209, 1211) in the core system logic block (1203) may be implemented at a hardware level as a special-purpose application-specific integrated circuit (ASIC) chip, which incorporates machine-coded and silicon-level hardware logic and functionality of one or modules (i.e. 1205, 1207, 1209, 1211) of the core system logic block (1203) that comprise the automated item recognition, tracking, and peer interest-based item valuation system.

In the preferred embodiment of the invention, the automated item recognition, tracking, and peer interest-based item valuation system also includes a computer graphics-generated and physical objects visualization device (1201), which is operatively connected (1219) to the core system logic block (1203) via one or more wireless and/or wired data networks, such as a wireless local area network (wireless LAN), a cellular data network, a cable modem network, a digital subscriber line (DSL) network, a Bluetooth connection, the Internet, or a combination thereof. In the preferred embodiment of the invention, the computer graphics-generated and physical objects visualization device (1201) is an electronic headset device, which typically incorporates both a head-mounted display (HMD) for mixed-reality environment visualization and an integrated headset camera for capturing images of physical objects in the headset's field of view. In another embodiment of the invention, the computer graphics-generated and physical objects visualization device (1201) is a smart phone display screen or another display screen of a mobile device, which is capable of showing physical objects in front of a camera integrated into the mobile device as well as computer graphics-generated contents that are superimposed in the mobile device display screen to provide an augmented-reality (AR) environment.

In the preferred embodiment of the invention, the item recognition and registration module (1205) in the automated item recognition, tracking, and peer interest-based item valuation system is configured to capture an image from the electronic headset device and execute a real-time object detection model to perform item classification involving object extractions and class categorizations. Examples of the real-time object detection model may include, but are not limited to, "You Only Look Once" (YOLO) computer vision algorithm and other similar algorithms that can be readily applied to the system implementation. In case of YOLO, it is preferable that the real-time object detection model is utilized in the automated item recognition, tracking, and peer interest-based item valuation system after an extensive machine-learning process is already completed by YOLO to categorize various classes of items autonomously and smartly from extracted objects from its computer vision. In one instance, YOLO is capable of predicting up to eighty classes of items autonomously (i.e. without human intervention).

The item recognition and registration module (1205) then performs image segmentation to separate background scenes from foreground item images, and subsequently performs item selection, which can filter out extraneous or non-substantive objects within the foreground item images to keep only substantive objects of interest. In one embodiment of the invention, the image segmentation process may utilize a "segment anything model" (SAM), or another competent segmentation model to separate background scenes from foreground item images. The filtering out process against extraneous or non-substantive objects may be executed by the item recognition and registration module (1205) autonomously without user intervention in one instance, or manually with at least some user input in another instance. The remaining substantive objects after the filter-out process are then identified as individual and substantive items, each of which is then associated with metadata (e.g. name of the item, current ownership information for the item, current market price or valuation of the item, etc.). The item and metadata pair is then formally registered in the automated item recognition, tracking, and peer interest-based item valuation system by being dynamically linked and stored in a system database.

Illustrations and descriptions for FIGS. 1~5 provided a usage example of the item recognition and registration module (1205) in action, in which the module executed tasks associated with initial image acquisition from an HMD or another mobile device, real-time object detection to perform item classification that includes object extractions and class categorizations, image segmentation for separating background scenes from foreground item images, item selection within the foreground item images, extraneous object filtering-out, remaining substantive item pairing with related metadata, and formal item registrations by storing selected items and related metadata in a system database. For one of ordinary skill in the art, various other applications of the item recognition and registration module (1205) in the automated item recognition, tracking, and peer interest-based item valuation system are implementable and deployable in other embodiments by utilizing the novel process described herein.

Optionally, if the system operator or the user prefers utilizing quick-response (QR) codes for automated item recognition and tracking, then the item recognition and registration module (1205) can also generate a QR code per registered item and metadata pair. The QR code can then be printed as a sticker and/or a paper label to a physical location or an item storage box to track the location of the registered item with the mixed-reality headset or another mobile device.

Continuing with the system diagram (1200) in FIG. 12, in the preferred embodiment of the invention, the item search accommodation module (1207) in the automated item recognition, tracking, and peer interest-based item valuation system is configured to provide a registered item search when the item search is requested by a user who is accessing the automated item recognition, tracking, and peer interest-based item valuation system via a mixed-reality (MR) head-mounted display (HMD) device or another mobile device. The item search accommodation moule (1207) can provide a three-dimensional holographic or a two-dimensional search interface menu and display it in the user's MR or AR visualization environment through the AR/MR computer graphics synthesis module (1211) in the automated item recognition, tracking, and peer interest-based item valuation system.

Upon receiving a user request for an item search, the item search accommodation module (1207) accesses a system database and retrieves a search result containing a list of relevant item(s) to the search request. Then, the user can select a particular item from the search interface provided by the item search accommodation module (1207) and visualize in the mixed-reality (MR) or augmented-reality (AR) environment. Typically, the item search accommodation module (1207), through the AR/MR computer graphics synthesis module (1211), also displays metadata (e.g. selected item name, category, current physical location of the selected item, selected item description, selected item ownership, etc.), which is dynamically paired and linked to the selected item in the MR or AR environment. A usage example of the item search accommodation module (1207) in action is previously demonstrated in FIGS. 7~8 and related descriptions.

In the preferred embodiment of the invention, if the user currently accessing and visualizing the selected item in the MR or AR environment is not the current owner of the selected item, then the automated item recognition, tracking, and peer interest-based item valuation system may inquire the user whether he or she likes the selected item owned by another user in the MR or AR environment. The system may even ask whether the user want to purchase the selected item either immediately or sometime in the future. If the user interests, likes, and willingness to purchase the selected item either immediately or sometime in the future are positive and present, then the automated item recognition, tracking, and peer interest-based item valuation system may record and utilize the increased user interests for the selected item in the dynamic price recommendation model for the selected item, which is processed by the user item price recommendation machine intelligence module (1209) in the system. In contrast, if the user interests, likes, and willingness to purchase the selected item either immediately or sometime in the future are negative or absent, then there are no changes to the dynamic price recommendation model for the selected item in one instance of the system implementation, or downward price pressure sentiments transmitted to the dynamic price recommendation model for the selected item in another instance of the system implementation.

Continuing with the system diagram (1200) in FIG. 12, in the preferred embodiment of the invention, the user item price recommendation machine intelligence module (1209) in the automated item recognition, tracking, and peer interest-based item valuation system is configured to provide an autonomous machine-determined pricing and/or valuation of a registered item based on peer user interests (1217) during MR/AR visualizations and also based on dynamically-changing external parameters, such as user order data (1213) trends and price data (1215) trends from online or offline stores.

In particular, the user item price recommendation machine intelligence module (1209) is designed to accumulate changes in user interests in registered and selected items, as each item is visualized and interacted with various peer users who do not own the item in the MR/AR environment. Furthermore, the user item price recommendation machine intelligence module (1209) periodically and autonomously (i.e. without human-triggered commands) seeks, updates, and stores current pricing data and recent price trends for each registered item from online or offline storefronts and auction sites. Then, the user item price recommendation machine intelligence module (1209) also tracks and updates metadata periodically for each item regarding the duration of ownership, use frequencies, and owner item preferences, which in turn keeps each registered item and related metadata pair up-to-date and robust in data quality.

Moreover, in the preferred embodiment of the invention, the user item price recommendation machine intelligence module (1209) in the automated item recognition, tracking, and peer interest-based item valuation system is configured to synthesize and dynamically update a machine-recommended selling price for a particular registered item based on evolving peer interest trends and pricing trends parameter values (i.e. 1213, 1215, 1217), if the item owner indicates interest in potentially selling the particular item. In one example, the machine-recommended selling price is initially configured or set by the user item price recommendation machine intelligence module (1209) as the initial purchase price of the item or the item owner's approximation of the market value of the item, which may be manually entered into the system by the item owner. Then, the user item price recommendation machine intelligence module (1209) autonomously updates and changes the machine-recommended valuation of the registered item by taking peer user interests and external pricing data trends into account.

For instance, if more peer users show interest on the registered item in the AR/MR visualization environment by gesturing thumbs up or invoking the "like" button within a defined period (e.g. a day a week, a month, etc.), the machine-recommended valuation of the registered item may be increased from the current valuation. In contrast, if most peer users ignore the registered item in the AR/MR visualization environment by avoiding feedback or interactions with the registered item within the defined period, then the machine-recommended valuation of the registered item may be decreased from the current valuation. Moreover, if the current price trends and/or the order frequency trends for the identical or similar item in online or offline stores or auction sites are positively increasing, then the machine-recommended valuation of the registered item from the user item price recommendation machine intelligence module (1209) may be increased from the current valuation. In contrast, if the current price trends and/or the order frequency trends for the identical or similar item in online or offline stores or auction sites are negative and/or decreasing, then the machine-recommended valuation of the registered item may be decreased from the current valuation. In the preferred embodiment of the invention, the magnitude of the increase or decrease in item valuation can correspond to relative percentage increase or decrease in peer interest and price and order trends parameters (i.e. 1213, 1215, 1217). For example, the updated valuation of the registered item may reflect the average of the three parameters (i.e. 1213, 1215, 1217) within a defined period (e.g. a day, a few days, a week, a few weeks, a month, a few months, etc.) by the user item price recommendation machine intelligence module (1209).

Furthermore, the user item price recommendation machine intelligence module (1209) utilizes the AR/MR computer graphics synthesis module (1211) to create and transmit (i.e. 1221) computer graphics-synthesized holograms, icons, and/or texts that are displayed in the user's field of vision in the AR/MR environment to enable the item owner and potential buyers to visualize the particular registered item and the machine-recommended selling price or item valuation information in real time. In the preferred embodiment of the invention, the AR/MR computer graphics synthesis module (1211) utilizes one or more graphics processing units (GPUs) integrated in a computer server to create computer graphics for the holograms, icons, and/or texts that can be displayed or visualized in three dimensions, in case of a mixed-reality (MR) environment, or in two dimensions, in case of an augmented-reality (AR) environment. Typically, system users, who may be item owners or peer viewers in the MR/AR environment, can utilize the computer graphics-generated and physical objects visualization device (1201) to experience, interact, and operate in the MR or AR environment provided by the automated item recognition, tracking, and peer interest-based item valuation system.

Figure 13:
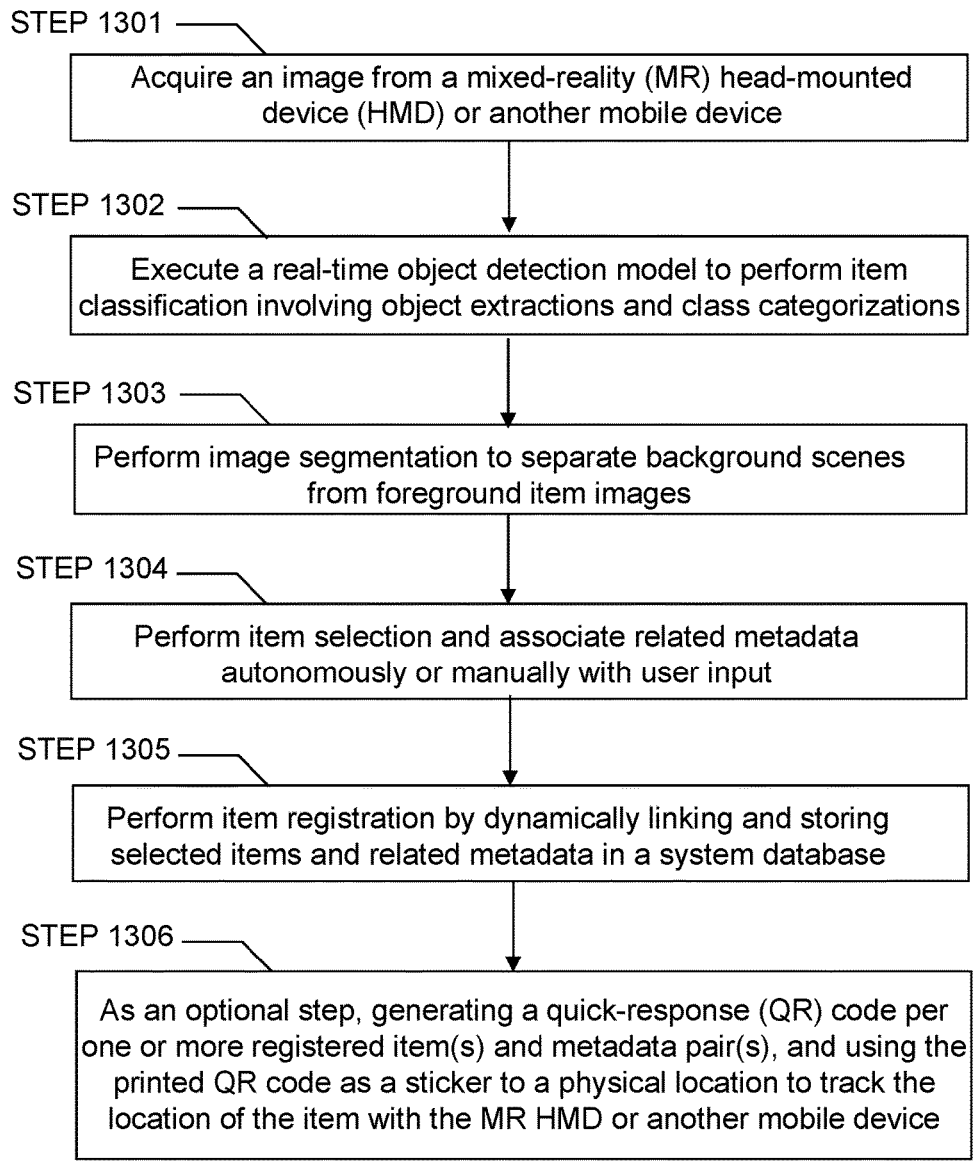
FIG. 13 shows an operation flowchart for the item registration and recognition module in the automated item recognition, tracking, and peer interest-based item valuation system, in accordance with an embodiment of the invention.

FIG. 13 shows an operation flowchart (1300) for the item registration and recognition module (i.e. 1205 in FIG. 12) in the automated item recognition, tracking, and peer interest-based item valuation system, in accordance with an embodiment of the invention. As a first step in operation, the item registration and recognition module acquires an image from a mixed-reality (MR) head-mounted display device (HMD) or another mobile device, as shown in STEP 1301. This image capture and acquisition step may be performed continuously or periodically in the background, as the user's field of vision perceived through the HMD or another mobile device scans one or more objects in a physical space. With captured image(s) from the HMD or another mobile device, the item registration and recognition module executes a real-time object detection model to perform item classification involving object extractions and class categorizations, as shown in STEP 1302.

Examples of the real-time object detection model may include, but are not limited to, "You Only Look Once" (YOLO) computer vision algorithm and other similar algorithms that can be readily applied to the system implementation. In case of YOLO, it is preferable that the real-time object detection model is utilized in the automated item recognition, tracking, and peer interest-based item valuation system after an extensive machine-learning process is already completed by YOLO to categorize various classes of items autonomously and smartly from extracted objects from its computer vision. In one instance, YOLO is capable of predicting up to eighty classes of items autonomously (i.e. without human intervention).

The item recognition and registration module then performs image segmentation to separate background scenes from foreground item images, as shown in STEP 1303, and subsequently performs item selection, which can filter out extraneous or non-substantive objects within the foreground item images to keep only substantive objects of interest, in STEP 1304. In one embodiment of the invention, the image segmentation process may utilize a "segment anything model" (SAM), or another competent segmentation model to separate background scenes from foreground item images. The filtering out process against extraneous or non-substantive objects may be executed by the item recognition and registration module autonomously without user intervention in one instance, or manually with at least some user input in another instance. The remaining substantive objects after the filter-out process are then identified as individual and substantive items, each of which is then associated with metadata (e.g. name of the item, current ownership information for the item, current market price or valuation of the item, etc.). The item and metadata pair is then formally registered in the automated item recognition, tracking, and peer interest-based item valuation system by being dynamically linked and stored in a system database, as shown in STEP 1305.

Illustrations and descriptions for FIGS. 1~5 provided a usage example of the item recognition and registration module in action, in which the module executed tasks associated with initial image acquisition from an HMD or another mobile device, real-time object detection to perform item classification that includes object extractions and class categorizations, image segmentation for separating background scenes from foreground item images, item selection within the foreground item images, extraneous object filtering-out, remaining substantive item pairing with related metadata, and formal item registrations by storing selected items and related metadata in a system database. For one of ordinary skill in the art, various other applications of the item recognition and registration module in the automated item recognition, tracking, and peer interest-based item valuation system are implementable and deployable in other embodiments by utilizing the novel process described herein.

As an optional step, as shown in STEP 1306, if the system operator or the user prefers utilizing quick-response (QR) codes for automated item recognition and tracking, then the item recognition and registration module can also generate a QR code per registered item and metadata pair. The QR code can then be printed as a sticker and/or a paper label to a physical location or an item storage box to track the location of the registered item with the mixed-reality headset or another mobile device.

Figure 14:
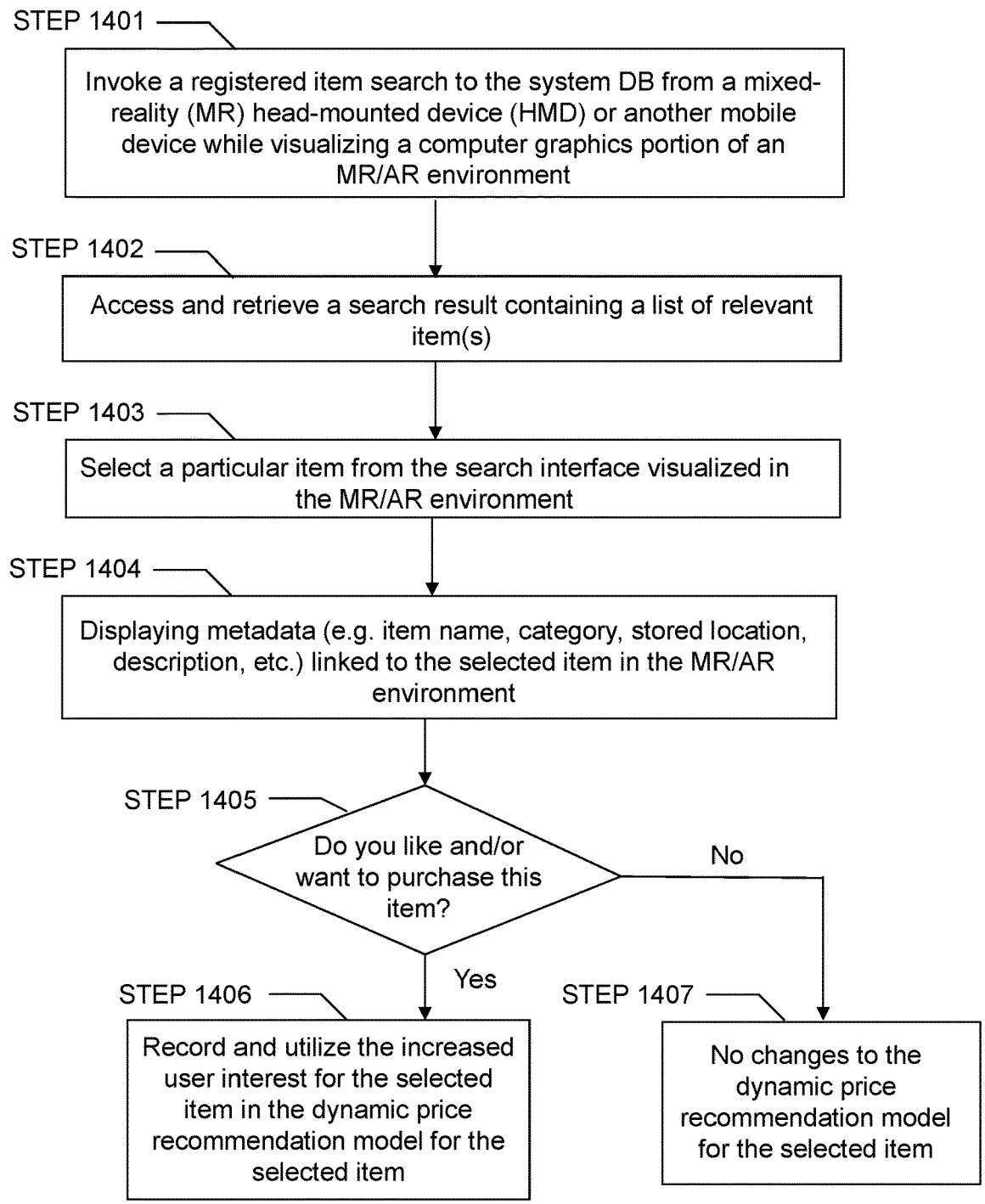
FIG. 14 shows an operation flowchart for the item search accommodation module in the automated item recognition, tracking, and peer interest-based item valuation system, in accordance with an embodiment of the invention.

FIG. 14 shows an operation flowchart (1400) for the item search accommodation module (i.e. 1207 in FIG. 12) in the automated item recognition, tracking, and peer interest-based item valuation system, in accordance with an embodiment of the invention. The item search accommodation module provides a registered item search when the item search is requested by a user who is accessing the automated item recognition, tracking, and peer interest-based item valuation system via a mixed-reality (MR) head-mounted display (HMD) device or another mobile device. In the preferred embodiment of the invention, the item search accommodation moule can provide a three-dimensional holographic or a two-dimensional search interface menu and display it in the user's MR or AR visualization environment via a computer graphics synthesis module and a wireless data transceiver.

As shown in STEP 1401 in the operation flowchart (1400), upon receiving a user request for an item search from a mixed-reality (MR) head-mounted display device (HMD) or another mobile device while the user visualizes a computer graphics portion of an MR/AR environment, the item search accommodation module invokes a registered item search to the system database (DB) connected to the automated item recognition, tracking, and peer interest-based item valuation system. Then, the item search accommodation module accesses a system database and retrieves a search result containing a list of relevant item(s) to the search request, as shown in STEP 1402. Then, the user can select a particular item from the search interface provided by the item search accommodation module and visualize in the mixed-reality (MR) or augmented-reality (AR) environment, as shown in STEP 1403. Typically, the item search accommodation module, through an AR/MR computer graphics synthesis module, also displays metadata (e.g. selected item name, category, current physical location of the selected item, selected item description, selected item ownership, etc.), which is dynamically paired and linked to the selected item in the MR or AR environment, as shown in STEP 1404. A usage example of the item search accommodation module in action is previously demonstrated in FIGS. 7~8 and related descriptions.

In the preferred embodiment of the invention, if the user currently accessing and visualizing the selected item in the MR or AR environment is not the current owner of the selected item, then the automated item recognition, tracking, and peer interest-based item valuation system may inquire the user whether he or she likes the selected item owned by another user in the MR or AR environment, as shown in STEP 1405. In some embodiments of the invention, the system may even ask whether the user want to purchase the selected item either immediately or sometime in the future. If the user interests, likes, and/or willingness to purchase the selected item either immediately or sometime in the future are positive and present, then the automated item recognition, tracking, and peer interest-based item valuation system may record and utilize the increased user interests for the selected item in the dynamic price recommendation model for the selected item, which is processed by the user item price recommendation machine intelligence module in the system, as shown in STEP 1406. In contrast, if the user interests, likes, and/or willingness to purchase the selected item either immediately or sometime in the future are negative or absent, then there are no changes to the dynamic price recommendation model for the selected item in one instance of the system implementation, as shown in STEP 1407. In another instance of the system implementation, instead of maintaining no changes to the dynamic price recommendation model, downward price pressure sentiments may be transmitted to the dynamic price recommendation model for the selected item for valuation adjustments, if the user interests, likes, and/or willingness to purchase the selected item either immediately or sometime in the future are negative or absent.

Figure 15:
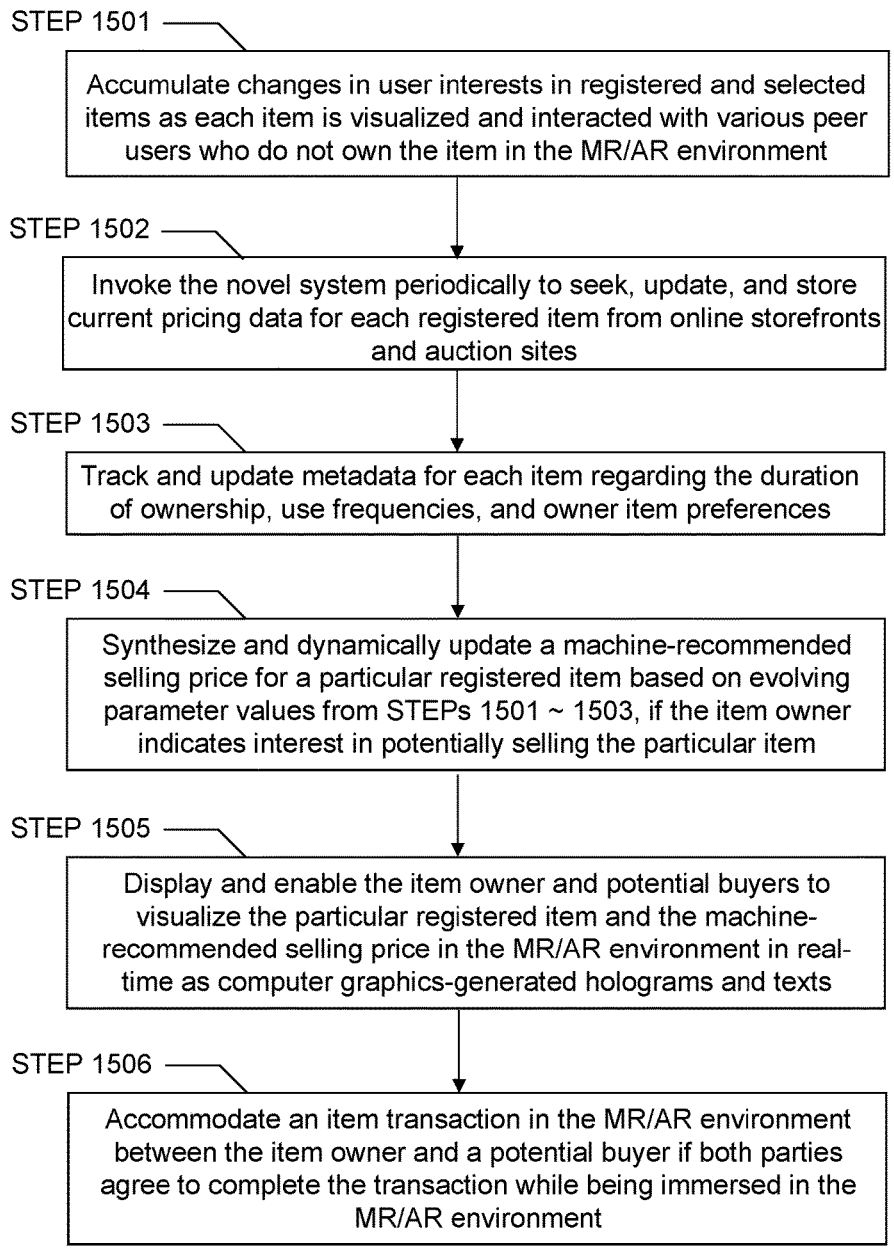
FIG. 15 shows an operation flowchart for the user item price recommendation machine intelligence module in the automated item recognition, tracking, and peer interest-based item valuation system, in accordance with an embodiment of the invention.

FIG. 15 shows an operation flowchart (1500) for the user item price recommendation machine intelligence module (i.e. 1209 in FIG. 12) in the automated item recognition, tracking, and peer interest-based item valuation system, in accordance with an embodiment of the invention. In the preferred embodiment of the invention, the user item price recommendation machine intelligence module in the automated item recognition, tracking, and peer interest-based item valuation system is configured to provide an autonomous machine-determined pricing and/or valuation of a registered item based on peer user interests during MR/AR visualizations and also based on dynamically-changing external parameters, such as user order data trends and price data trends from online or offline stores.

In particular, as illustrated in the operation flowchart (1500), the user item price recommendation machine intelligence module is configured to accumulate changes in user interests in registered and selected items, as each item is visualized and interacted with various peer users who do not own the item in the MR/AR environment, as shown in STEP 1501. Furthermore, the user item price recommendation machine intelligence module periodically and autonomously (i.e. without human-triggered commands) seeks, updates, and stores current pricing data and recent price trends for each registered item from online or offline storefronts and auction sites, as shown STEP 1502. Then, the user item price recommendation machine intelligence module also tracks and updates metadata periodically for each item regarding the duration of ownership, use frequencies, and owner item preferences, as shown in STEP 1503, which in turn keeps each registered item and related metadata pair up-to-date and robust in data quality. Moreover, in the preferred embodiment of the invention, the user item price recommendation machine intelligence module in the automated item recognition, tracking, and peer interest-based item valuation system is configured to synthesize and dynamically update a machine-recommended selling price for a particular registered item based on evolving peer interest trends and pricing trends parameter values from STEPs 1501~1503, if the item owner indicates interest in potentially selling the particular item, as shown in STEP 1504.

In one example, the machine-recommended selling price is initially configured or set by the user item price recommendation machine intelligence module as the initial purchase price of the item or the item owner's approximation of the market value of the item, which may be manually entered into the system by the item owner. Then, the user item price recommendation machine intelligence module autonomously updates and changes the machine-recommended valuation of the registered item by taking peer user interests and external pricing data trends into account. For instance, if more peer users show interest on the registered item in the AR/MR visualization environment by gesturing thumbs up or invoking the "like" button within a defined period (e.g. a day a week, a month, etc.), the machine-recommended valuation of the registered item may be increased from the current valuation. In contrast, if most peer users ignore the registered item in the AR/MR visualization environment by avoiding feedback or interactions with the registered item within the defined period, then the machine-recommended valuation of the registered item may be decreased from the current valuation.

Moreover, if the current price trends and/or the order frequency trends for the identical or similar item in online or offline stores or auction sites are positively increasing, then the machine-recommended valuation of the registered item from the user item price recommendation machine intelligence module may be increased from the current valuation. In contrast, if the current price trends and/or the order frequency trends for the identical or similar item in online or offline stores or auction sites are negative and/or decreasing, then the machine-recommended valuation of the registered item may be decreased from the current valuation. In the preferred embodiment of the invention, the magnitude of the increase or decrease in item valuation can correspond to relative percentage increase or decrease in peer interest and price and order trends parameters. For example, the updated valuation of the registered item may reflect the average of the three parameters (i.e. 1213, 1215, 1217 in FIG. 12) within a defined period (e.g. a day, a few days, a week, a few weeks, a month, a few months, etc.) by the user item price recommendation machine intelligence module.

Continuing with the operation flowchart (1500) in FIG. 15, the user item price recommendation machine intelligence module can display and enable the item owner and potential buyers to visualize the particular registered item and the machine-recommended selling price in the MR/AR environment in real-time as computer graphics-generated holograms, images, icons, and/or texts, as shown in STEP 1505. In one embodiment of the invention, the user item price recommendation machine intelligence module utilizes an MR/AR computer graphics synthesis module (e.g. 1211 in FIG. 12) to create and transmit computer graphics-synthesized holograms, images, icons, and/or texts that are displayed in the user's field of vision in the MR/AR environment to enable the item owner and potential buyers to visualize the particular registered item and the machine-recommended selling price or item valuation information in real time.

Typically, system users, who may be item owners or peer viewers in the MR/AR environment, can utilize computer graphics-generated and physical objects visualization devices to experience, interact, and operate in the MR or AR environment provided by the automated item recognition, tracking, and peer interest-based item valuation system. As an optional process, the automated item recognition, tracking, and peer interest-based item valuation system may also accommodate an item transaction in the MR/AR environment between an item owner and a potential buyer, if both parties agree to complete the transaction while being immersed in the MR/AR environment, as shown in STEP 1506.

Various embodiments of the automated item recognition, tracking, and peer interest-based item valuation system and related methods of operating such a system described herein provide significant and unique advantages to conventional ways of organizing, location-tracking, divesting, and/or monetizing physical and virtual items in a user's residence or office. For example, one advantage of the novel system and the method of operating thereof is enabling automated item recognition and location tracking with computer graphics-aided visualization to users immersed in an augmented-reality (AR) or mixed-reality (MR) environment. In addition, another advantage of the novel system and the method of operating thereof is enabling peer user interest-based item valuation for registered items that are owned by a particular user immersed in the AR or MR environment.

Furthermore, another advantage of the novel system and the method of operating thereof is enabling autonomous intelligent machine valuation of user items that are registered and visualized in the AR or MR environment based on real-time changes in peer user interests and comparable pricing metrics from online stores, physical stores, or auction sites. Moreover, another advantage of the novel system and the method of operating thereof is enabling item purchases, exchanges, and/or transactions between a current item owner and an interested peer user immersed in the computer graphics-aided visualizations in the AR or MR environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. An automated item recognition, tracking, and peer interest-based item valuation system comprising:

a computer graphics-generated and physical object visualization device, which is either an electronic headset device incorporating a head-mounted display (HMD) and a headset camera, or a mobile device incorporating a display screen and a camera, operatively connected to a core system logic block via a wired or wireless data network, wherein the computer graphics-generated and physical object visualization device is configured to enable a user to visualize an intermixture of physical objects and computer graphics-generated holograms, images, icons, or texts within the user's field of view of the physical objects in a mixed-reality (MR) or augmented-reality (AR) environment;

an item recognition and registration module of the core system logic block operatively connected to the computer graphics-generated and physical object visualization device via the wired or wireless data network, wherein the item recognition and registration module receives a captured image of the user's field of view from the headset camera or the camera integrated in the computer graphics-generated and physical object visualization device, and subsequently executes a real-time object detection model to perform item classification involving object extractions and class categorizations from the captured image, and then performs image segmentation to separate background scenes from foreground item images contained in the captured image, with an output of the item recognition and registration module being a user item image separated from extraneous information in the captured image after executing the real-time object detection model and the image segmentation, and wherein the user item image is subsequently registered and stored in a system database;

an item search accommodation module of the core system logic block operatively connected to the item recognition and registration module and the computer graphics-generated and physical object visualization device, wherein the item search accommodation module provides a registered item search interface to the user immersed in the MR or AR environment, accesses the system database and retrieves a search result containing a list of relevant items, and displays a particular item and related metadata selected by the user among the list of relevant items, and wherein the item search accommodation module indicates graphically within the user's field of view a current known location of the particular item searched by the user and also inquires the user whether the user likes or intends to purchase the particular item, if the particular item is owned by another system user in the MR or AR environment;

a user item price recommendation machine intelligence module of the core system logic block operatively connected to the item search accommodation module and the computer graphics-generated and physical object visualization device, wherein the user item price recommendation machine intelligence module accumulates changes in peer user interests that measure frequency of interactions, duration of item visualizations, and item likes indications between each peer user and the particular item while each peer user is immersed and visualizing various objects over a defined period of time in the MR or AR environment, and wherein the user item price recommendation machine intelligence module autonomously seeks, updates, and stores current price trends and order trends of the particular item in online storefronts and auction sites, and wherein the user item price recommendation machine intelligence module then creates and updates a machine-recommended selling price for the particular item based on the changes in the peer user interests, the current price trends, and the order trends of the particular item over the defined period of time; and a computer graphics synthesis module of the core system logic block executed in a graphics processing unit (GPU) and a memory unit of a computer server, wherein the computer graphics synthesis module is operatively connected to all other modules in this system and creates graphical and textual information regarding the current known location of the particular item searched by the user and the machine-recommended selling price for the particular item for visualization by the user and peer users in the MR or AR environment wherein the item recognition and registration module, the item search accommodation module, and the user item price recommendation machine intelligence module are part of the core system logic block integrated in an application-specific integrated circuit (ASIC) semiconductor chip as a special-purpose hardware device in one implementation, or alternatively, stored in a non-volatile memory unit of the computer server for execution in the GPU, a central processing unit (CPU), and a volatile memory unit of the computer server in another implementation.

2. The system of claim 1, further comprising a quick-response (QR) code paper label or a sticker printed by a printer operatively connected to the item recognition and registration module, wherein the QR code paper label or the sticker contains user item-identifying information for dynamic location tracking of user items that are already registered by the automated item recognition, tracking, and peer interest-based item valuation system.

3. The system of claim 1, wherein the machine-recommended selling price for the particular item increases when an average of the peer user interests, the current price trends, and the order trends for the particular item increases.

4. The system of claim 1, wherein the machine-recommended selling price for the particular item decreases when an average of the peer user interests, the current price trends, and the order trends for the particular item decreases.

5. The system of claim 1, wherein the item recognition and registration module dynamically links and pairs the user item image separated from the extraneous information in the captured image with the related metadata, which comprises an item name, an item category, a current physical location of the user item, a user item description, and item ownership information.

6. The system of claim 1, wherein the extraneous information in the captured image is non-substantive object information or background image information contained in the captured image that were filtered out during the object extractions, the class categorizations, and the image segmentation executed by the image recognition and registration module.

* * * * *